UNITED STATES PATENT OFFICE 2,547,714

FURANE AMINO KETO COMPOUNDS

Loren M. Long, Grosse Pointe Woods, and Nickolas D. Jenesel, Detroit, Mich., assignors to Parke, Davis & Company, Detroit, Mich., a corporation of Michigan No Drawing. Application March 9, 1950, Serial No. 148,755

7 Claims. (Cl. 260—345)

This application is a continuation in part of our co-pending application Serial No. 83,769, filed March 26, 1949, and the invention relates to certain new amino ketones and to methods for obtaining the same. More particularly, the invention relates to amino ketones of the furane series having the formula,

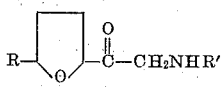

where R is hydrogen, nitro, halogen or a lower alkyl radical and R' is hydrogen, H.HY, or an acyl radical. HY being one equivalent of a strong mineral acid such as hydrochloric, hydrobromic, hydriodic, sulfuric, phosphoric and the like. The term "acyl" as used herein includes saturated and unsaturated lower aliphatic acyl, halogen-substituted lower aliphatic acyl, carboxy-substituted lower aliphatic acyl, cyano-substituted lower aliphatic acyl, ether-substituted lower aliphatic acyl, ester-substituted lower aliphatic acyl, benzoyl, substituted benzoyl, araliphatic acyl, furoyl, pyridinoyl and the like radicals.

Our process for obtaining the compounds of the invention may be diagrammatically illustrated as follows:

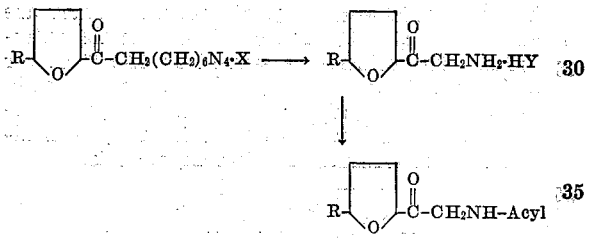

where X is a halogen atom and R and HY have the same significance as given above.

The first step of our process comprises hydrolyzing a 2-furyl halomethyl ketone-hexamethylenetetramine complex of the formula,

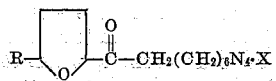

to the corresponding 2-furyl aminomethyl ketone acid addition salt. This hydrolysis is carried out in aqueous solution, using an inorganic mineral acid such as hydrochloric, hydrobromic, hydriodic, sulfuric or phosphoric acids as the hydrolytic agent. Due to the rather unstable nature of the 2-furyl aminomethyl ketone product, the excess hydrolytic agent must be removed either by distillation in the case of the volatile acids or by precipitation as an insoluble metal salt in the case of the non-volatile acids as soon as the reaction is complete. Due to the ease of removal by distillation in vacuo the hydrohalic acids are the preferred hydrolytic agents. Where it is desired to proceed with the second step of the process without isolation of the 2-furyl aminomethyl ketone compound, the excess hydrolytic agent need not be removed by the method set forth above but merely neutralized with a weakly alkaline substance such as an alkali metal acetate, phosphate, carbonate or bicarbonate. Regardless of the acid selected as the hydrolysis catalyst the 2-furyl aminomethyl ketone acid addition salt formed consists principally of the salt corresponding to the acid used in hydrolysis.

The hydrolysis reaction can be carried out at temperatures varying from about 0° to 50° C. However, we prefer to use a temperature of about 20 to 30° C. since in this temperature range the reaction proceeds at a reasonable rate and the danger of decomposition of the starting material and/or the final product is almost at a minimum.

The second step of the process comprises converting the mineral acid addition salt of the 2-furyl aminomethyl ketone obtained in the first step of the process to the corresponding 2-furyl acylamidomethyl ketone of formula,

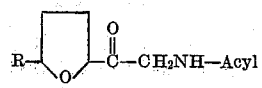

In carrying out this acylation an acid addition salt of the 2-furyl aminomethyl ketone must be employed as the starting material since the free bases of these amino ketones are rather unstable. However, in order for the acylation reaction to take place the 2-furyl aminomethyl ketone compound must be in the form of its free base or an organic acid addition salt and it is, therefore, necessary to generate simultaneously the free base or the organic acid addition salt in the reaction mixture and to acylate it. This is accomplished by carrying out the reaction in the presence of a weakly alkaline substance such as an alkali metal salt of an organic acid, an alkali or alkaline earth metal carbonate or bicarbonate, tertiary organic base, a hydroxide of an amphoteric metal, calcium hydroxide and the like. Some specific examples of such weakly alkaline substances are sodium acetate, sodium bicarbonate, potassium bicarbonate, sodium carbonate, calcium carbonate, magnesium carbonate, pyridine, quinoline triethylamine and aluminum hydroxide.

As acylating agents, acyl halides or acyl anhydrides can be employed in conjunction with either aqueous or non-aqueous reaction mediums.

The temperature of the reaction is not particularly critical and can be varied over a considerable range without any significant deleterious effect upon the yields of the final products. In general, temperatures varying from about 0° C. to about 50° C. can be used although when a non-aqueous reaction mixture is employed the temperature can be increased slightly if desired.

The products of the invention are useful as intermediates in the preparation of other organic compounds. They are of particular value in the preparation of organic compounds possessing antibiotic activity against micro-organisms of the Rickettsia type.

The invention is illustrated by the following examples:

Example 1

150 g. of 2-furyl bromomethyl ketone-hexamethylenetetramine complex is added to 800 cc. of 6 N hydrochloric acid and the mixture allowed to stand at room temperature for about forty-five minutes. The reaction mixture is evaporated to dryness in vacuo to obtain the desired 2-furyl aminomethyl ketone hydrochloride which has the formula,

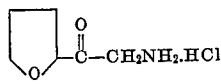

Example 2

50 g. of 2-furyl aminomethyl ketone hydrochloride is added to a mixture of 500 ml. of pyridine and 85 ml. of crotonyl chloride. After standing at room temperature for one hour, the mixture is stirred into cold water. The 2-furyl crotonamidomethyl ketone which separates is recrystallized from aqueous alcohol. This compound has the formula,

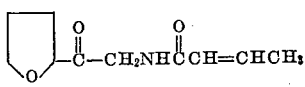

Example 3

50 ml. of 2-furyl chloride is slowly added to a solution of 30 g. of 2-furyl aminomethyl ketone hydrochloride in 200 ml. of pyridine maintained at 10 to 15° C. After the temperature of the solution rises to about 25° C. the solution is poured into cold water. The 2-furyl furamidomethyl ketone which separates is recrystallized from aqueous dioxane. This compound has the formula,

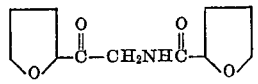

Example 4

63 g. of 2-furyl aminomethyl ketone hydrochloride in 250 ml. of pyridine is treated with 70 g. of p-toluyl chloride and the resulting solution is stirred for one hour at room temperature. The mixture is poured into water and the 2-furyl p-toluamidomethyl ketone which separates is recrystallized from aqueous alcohol. This compound has the formula,

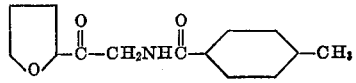

Example 5

60 g. of 2-furyl aminomethyl ketone hydrochloride in 250 ml. of pyridine is treated with 155 g. of acetoxyacetic anhydride. After stirring at room temperature for two and one-half hours, the solution is concentrated in vacuo to obtain a syrup which, on dilution with cold water, solidifies. The 2-furyl acetoxyacetamidomethyl ketone is crystallized from aqueous alcohol. This compound has the formula,

Example 6

350 g. of 5-nitro-2-furyl bromomethyl ketone-hexamethylenetetramine complex is added to 1500 cc. of 6 N hydrochloric acid and the mixture allowed to stand at room temperature for one hour. The reaction mixture is evaporated to dryness in vacuo at room temperature to obtain the desired 5-nitro-2-furyl aminomethyl ketone hydrochloride. This product has the formula,

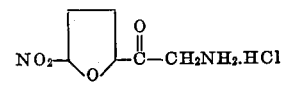

Example 7

150 g. of 5-nitro-2-furyl aminomethyl ketone hydrochloride is dissolved in a mixture composed of 1 liter of glacial acetic acid and 300 cc. of acetic anhydride. 85 g. of sodium acetate is added in small portions with stirring to a mixture and after the addition has been completed the solution is diluted with water. The insoluble 5-nitro-2-furyl acetamidomethyl ketone which separates from the solution is collected, washed with a small amount of water and dried. The formula of this product is,

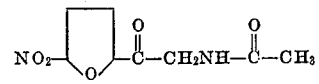

Example 8

37.4 g. of 5-nitro-2-furyl aminomethyl ketone hydrochloride and 30 g. of sodium acetate are added to about 100 ml. of dichloroacetic anhydride. The solution is stirred at 40–50° C. for one hour. Upon stirring into water, the solid 5-nitro-2-furyl dichloroacetamidomethyl ketone separates, and is recrystallized from aqueous alcohol. The formula of this compound is,

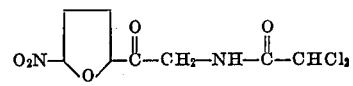

Example 9

200 g. of 5-iodo-2-furyl bromomethyl ketone-hexamethylenetetramine complex is added to 1 liter of 6 N hydrochloric acid and the mixture allowed to stand at room temperature for about one hour. The reaction mixture is evaporated to dryness in vacuo at room temperature to obtain the desired 5-iodo-2-furyl aminomethyl ketone hydrochloride of formula,

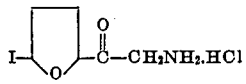

Example 10

A mixture consisting of 45 g. of 5-iodo-2-furyl aminomethyl ketone hydrochloride, 50 g. of benzoic anhydride and 6 g. of sodium acetate is heated to about 45° C. and stirred as small amounts of ice and water are added from time to time. After about one hour the mixture is diluted with water, cooled, adjusted to pH 8 with sodium hydroxide and the desired 5-iodo-2-furyl benzamidomethyl ketone which separates collected. The product is washed with water and dried. It has the formula,

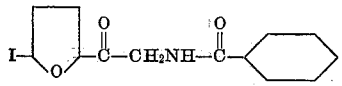

Example 11

110 g. of 5-chloro-2-furyl bromomethyl ketone-hexamethylenetetramine complex is added to 650 ml. of 6 N phosphoric acid and the mixture allowed to stand at room temperature for one hour. The solution is evaporated to a syrup in vacuo. This syrup is poured into about 200 ml. of absolute alcohol and cooled. Upon standing overnight, the solution deposits crystals of 5-chloro-2-furyl aminomethyl ketone phosphate which has the formula,

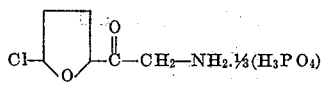

Example 12

27 g. of 5-chloro-2-furyl aminomethyl ketone phosphate and 15 g. of cyanoacetyl chloride are stirred with 50 ml. of pyridine for one and one-half hours at room temperature. Upon pouring the mixture into water, the solid 5-chloro-2-furyl cyanoacetamidomethyl ketone separates and is recrystallized from ethyl acetate. This compound has the formula:

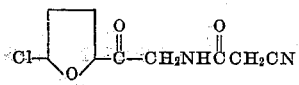

Example 13

115 g. of 5-bromo-2-furyl bromomethyl ketone-hexamethylenetetramine complex is added to 700 ml. of 6 N sulfuric acid and the mixture is allowed to stand at room temperature for one hour. The solution is concentrated to about 100 ml. and poured into two volumes of ethanol. The 5-bromo-2-furyl aminomethyl ketone sulfate which separates is recrystallized from aqueous alcohol. This compound has the formula,

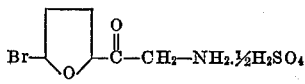

Example 14

53 g. of 5-bromo-2-furyl aminomethyl ketone sulfate and 70 g. of bromoacetyl bromide are stirred with 200 ml. of pyridine at room temperature for one-half hour. The solution is concentrated to 100 ml. and poured into cold water. The 5-bromo-2-furyl bromoacetamidomethyl ketone which separates is recrystallized from aqueous dioxane. This compound has the formula,

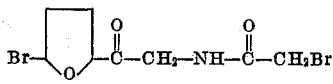

Example 15

175 g. of 5-methyl-2-furyl bromomethyl ketone-hexamethylenetetramine complex is added to 1 liter of 6 N hydrobromic acid and the resulting mixture allowed to stand at room temperature for about forty-five minutes. The reaction mixture is evaporated to dryness in vacuo to obtain the desired 5-methyl-2-furyl aminomethyl ketone hydrobromide of formula,

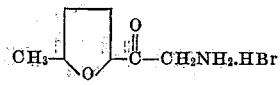

Example 16

55 g. of 5-methyl-2-furyl aminomethyl ketone hydrobromide is added to a mixture consisting of 70 g. of dry pyridine and 50 g. of phenyl acetyl chloride, keeping the temperature below about 5° C. After stirring for about one hour 1 liter of cold water is added and the precipitated product collected. The product thus obtained is 5-methyl-2-furyl phenylacetamidomethyl ketone of formula,

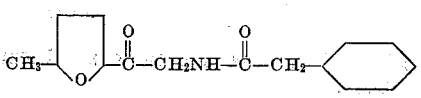

Example 17

31 g. of 5-methyl-2-furyl aminomethyl ketone hydrobromide and 26 g. of succinic anhydride are stirred with 100 ml. of pyridine at 50° C. for two hours. The solution is poured into water, and the 5-methyl-2-furyl succinamidomethyl ketone is precipitated by acidification of the resulting solution with 6 N hydrochloric acid. This material is recrystallized from aqueous alcohol. This compound has the formula,

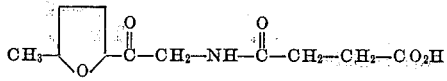

Example 18

60 g. of 5-ethyl-2-furyl bromomethyl ketone-hexamethylenetetramine complex is added to 300 ml. of 20% hydriodic acid and the mixture is kept at room temperature for one hour. Evaporation of the solution gives a residue of 5-ethyl-2-furyl aminomethyl ketone hydriodide which is crystallized from aqueous methanol. This compound has the formula,

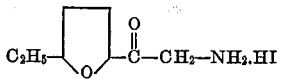

Example 19

17 g. of 5-ethyl-2-furyl aminomethyl ketone hydriodide and 14.5 g. of sodium acetate are stirred with 75 g. of methoxyacetic anhydride at 50° C. for forty-five minutes. The mixture is poured into cold water whereupon the 5-ethyl-2-furyl methoxyacetamidomethyl ketone separates as an oil. After this oil crystallizes it is recrystallized from aqueous alcohol. This compound has the formula,

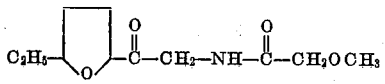

Example 20

31 g. of 2-furyl aminomethyl ketone hydrochloride and 39.5 g. of nicotinoyl chloride are stirred with 200 ml. of pyridine for one and one-half hours. The solution is evaporated to about 100 ml. and poured into water. The 2-furyl 3'-nicotinamidomethyl ketone which separates is recrystallized from aqueous dioxane. This compound has the formula,

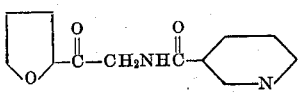

The 2-furyl halomethyl ketone-hexamethylenetetramine complexes used as starting materials in the practice of the invention can be prepared by the reaction of a 2-furyl halomethyl ketone with hexamethylenetetramine in an inert organic solvent. This general process can be diagrammatically depicted as follows:

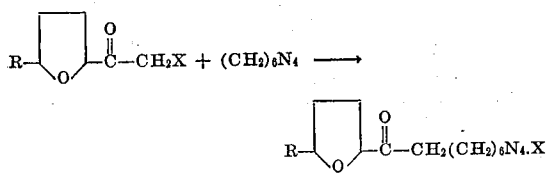

where R and X have the same significance as given above.

The following examples serve to illustrate the application of this general method to the preparation of some of the specific starting materials used in the foregoing examples:

a. 228 g. of 5-nitro-2-furyl bromomethyl ketone dissolved in a small amount of carbon tetrachloride is added to 150 g. of hexamethylenetetramine in 1 liter of carbon tetrachloride. The mixture is allowed to stand at room temperature for about three hours and the 5-nitro-2-furyl bromomethyl ketone - hexamethylenetetramine complex which separates collected, washed with a little chloroform and dried. The formula of this product is,

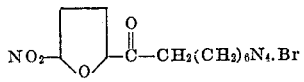

b. 75 g. of hexamethylenetetramine dissolved in 100 cc. of carbon tetrachloride is added to 95 g. of 2-furyl bromomethyl ketone in 400 cc. of carbon tetrachloride. The solid reaction product begins to separate almost immediately and the temperature of the reaction mixture rises somewhat. After allowing the mixture to stand for about two hours the 2-furyl bromomethyl ketone-hexamethylenetetramine complex is collected, washed with a little carbon tetrachloride and dried. The formula of this product is,

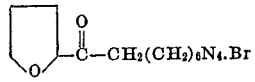

What we claim is:
1. A compound of the formula,

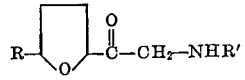

where R is a member of the class consisting of hydrogen, nitro, halogen and lower alkyl radicals and R' is a member of the class consisting of hydrogen, H.HY, and acyl radicals, said HY group being one equivalent of a strong mineral acid.

2. A compound of the formula,

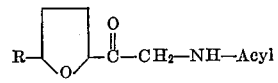

where R is a member of the class consisting of hydrogen, nitro, halogen, and lower alkyl radicals.

3. 2-furyl acetamidomethyl ketone.
4. 5-nitro-2-furyl acetamidomethyl ketone.
5. 5-nitro - 2 - furyl dichloroacetamidomethyl ketone.
6. 5-bromo-2-furyl bromoacetamidomethyl ketone.
7. 5-iodo-2-furyl benzamidomethyl ketone.

LOREN M. LONG.
NICKOLAS D. JENESEL.

No references cited.